A. L. WALLACE.
WRENCH.
APPLICATION FILED JUNE 13, 1914.

1,130,863.

Patented Mar. 9, 1915.

Attest:
E. M. Hamilton
B. L. Bishop

Inventor:
Archibald L. Wallace.
by Spear, Middleton, Donaldson & Spear
Attys.

UNITED STATES PATENT OFFICE.

ARCHIBALD LYLE WALLACE, OF LONDON, ENGLAND.

WRENCH.

1,130,863. Specification of Letters Patent. Patented Mar. 9, 1915.

Application filed June 13, 1914. Serial No. 845,036.

*To all whom it may concern:*

Be it known that I, ARCHIBALD LYLE WALLACE, subject of Great Britain, residing at 22 Westminster Palace Gardens, Victoria street, London, S. W., England, have invented certain new and useful Improvements in Wrenches, of which the following is a specification.

This invention relates to that type of pipe wrench or spanner comprised of a lever and a chain or flexible member, one end of the chain being attached to the lever by a screw bolt and nut located in or on the lever; the said screw bolt and nut being used for adjusting the flexible member around the pipe to be gripped. In this type of wrench after the chain is properly adjusted the first movement of the lever in the direction of screwing up tightens the grip of the chain or flexible member around the pipe, so that the further movement of the lever carries the pipe with it. The movement of the lever in the opposite direction loosens the grip of the flexible member, in many cases to such an extent that the flexible member may become detached from the lever unless special care is exerted to prevent this. In the said type of pipe wrench, it is essential that no part of the lever or any part rigidly attached thereto should touch the pipe, the flexible member only having contact with the pipe. My invention therefore does not relate in any way to that type of pipe wrench in which serrated teeth rigidly fixed to the lever form part of the surfaces which are brought into contact with the pipe.

My invention relates to means whereby, while preserving ease of adjustment of the flexible member to suit pipes of a certain size, and facility of attaching it around and detaching it from different pipes of the same size, the improved pipe wrench grips the pipe only when the lever is pressed in one direction and slides easily over the surface of the pipe when pressed in the opposite direction, thus permitting it to be used like a ratchet spanner, without risk of the flexible member becoming detached from the lever.

My invention also provides means for automatically preventing overstraining of the flexible member which might otherwise be produced by excessive toggle action.

In a secondary degree my invention relates to the structural form of certain of the parts whereby the objects above stated are conveniently obtained.

Figure 1:
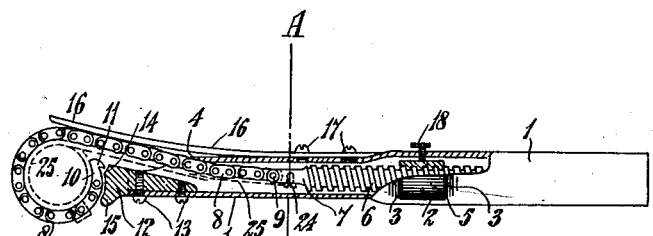
Figure 2:
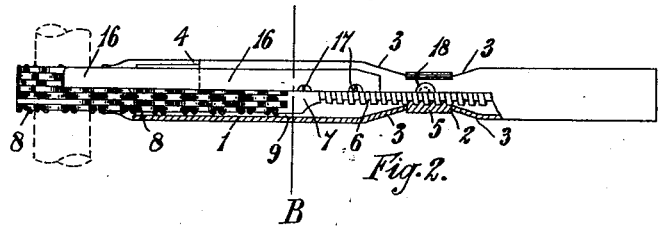
Figure 3:
Figure 4:
Figure 6:
Figure 5:
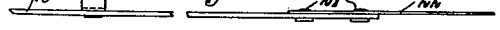
Figure 7:
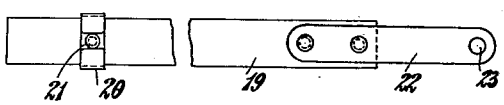

Figure 1 is an elevation, partly in section, showing the wrench as it would appear when in use on a horizontal "pipe." Fig. 2 is a plan projected from the above, part being shown in section. Fig. 3 is a sectional view on the line A B. Fig. 4 is a detail view. Figs. 5, 6 and 7 are respectively, elevation, end elevation and plan of a strap of protective material which may be used in conjunction with the wrench for polished work.

1 consists of a hollow lever, non-circular throughout part of its length, the remainder being rounded to form a handle, having two openings 2 on either side, the material surrounding which is bent slightly inward at the points 3, and having the upper portion of the non-circular end partly cut away at point 4.

5 is a milled nut free to rotate in the aforesaid openings 2, but is prevented from traveling longitudinally by the depressions 3. This nut 5 is fitted with a bolt 6 having a head 7 so shaped that it is free to slide along the non-circular interior of the lever 1 but cannot rotate, and is forked to receive the end of the block chain 8 which is attached to it by means of the pin 9. 10 is an abutment piece of hardened steel or other suitable material, of the same width as the chain, and attached to its extremity in the same manner as the head of the bolt, and having its inner surface concave where it rests against the object to be turned, while the outer side is provided with a knife-edge or equivalent 11.

12 is a block of hardened steel or other suitable material, attached to the head or non-circular end of the lever 1 by means of the screws 13 in such a manner that it can be readily removed when it is required to insert or extract the bolt 6, and it is so shaped as to leave an opening between it and the cut away portion 4 of the lever 1 for the chain 8 to pass through. The outer end of the said block 12 is furnished with a groove 14 running transversely along its upper edge while the lower edge forms a curved projection 15.

16 is a spring fastened to the upper side of the non-circular portion of the lever 1 by means of screws or rivets 17.

18 is a set screw having a milled head which is screwed through the material of the lever 1 so that it may be made at will to bear on or clear the nut 5.

To use the wrench, the set screw 18 is slackened off to clear the nut 5, the flexible member 8 is then placed around the "pipe" to be operated upon and the groove 14 is made to engage with the knife-edge 11 on the abutment piece 10 in such a manner that the former becomes a fulcrum for the lever 1. The flexible member 8 is then tightened by revolving the milled nut 5 until the projection 15 on the triangular block 12 is clear of the flexible member 8, after which any strain downward on the handle causes the flexible member 8 to grip uniformly all around the "pipe". Pressure in the opposite direction allows the chain to slip over the surface of the "pipe" without becoming detached therefrom, owing to the pressure exerted by the spring 16, which bears on the outside of the flexible member 8 to prevent the before mentioned knife-edge 11 and groove 14 from becoming disengaged when the handle is raised. It will be apparent that as the lever 1 is depressed the flexible member 8 draws nearer to the knife-edge 11 or fulcrum thus greatly increasing the leverage and straining the said flexible member 8 to a greater degree than is necessary to maintain a good grip, and to obviate this said overstraining I provide the projection 15 to bear on the outside of the flexible member 8 when the lever 1 is depressed beyond a certain prearranged point. The wrench can be removed from the "pipe" without altering the adjustment, by pressing the lever 1 downward and at the same time pulling it away from the "pipe", when the knife edge 11 and the groove 14 disengage. It can be replaced by encircling the "pipe" with the flexible member 8 and pressing downward until the knife-edge 11 and the groove 14 engage with one another. When the wrench is thus adjusted to any particular size of pipe the nut 5 may be locked by screwing up the set screw 18.

In order that the wrench may be used on soft material or polished work, such as copper or nickel plated tubes and the like, without damaging the surface thereof, when the flexible member 8 is made of steel or other hard material, I provide a strap which may be attached to or detached from the underside of the said flexible member 8 at will and which may take the form shown in Figs. 5, 6 and 7 where 19 is a strip of leather or other suitable protective material, provided near one end with a steel clip 20, stitched to it or attached by a copper rivet 21, while the other end is provided with a short strip of flat steel 22 similarly attached and having a hole 23 at its outer end. To attach the above strap the clip 20 is passed over the free end of the flexible member 8 so as to bring the strap on the side which will be next the "pipe", the steel strip 22 is then attached to the head 7 of the bolt 6 by means of the hole 23 and the screw 24. The dotted lines 25, Fig. 1, show the position of the strap when in use.

My object in using a screw for the adjustment of the flexible member 8 is, that by this means I get a fine adjustment, this fine adjustment being advantageous to the proper working of a wrench of this description, but as a long screw might be objectionable in large wrenches owing to its cost and the time required for adjustment, I do not confine myself to its use alone but may use it in conjunction with a rack or equivalent. Although I prefer to have the knife-edge or equivalent 11 situated on the abutment piece 10 as shown in Fig. 1 I do not confine myself to this but may have it on the block 12 in which case the groove 14 would be on the abutment piece 10; this arrangement is shown in Fig. 4.

In cutting away the hollow lever at the point 4 it will be apparent that a bridge is formed over the flexible member 8, which bridge is an important feature of my invention as it prevents side strain on the bolt 6, and its position in relation to the fulcrum of the lever is of considerable importance in aiding the flexible member 8 to obtain a good grip.

I claim:—

1. In a pipe wrench, the combination of a chain, a screw bolt jointed to one end of the said chain, an abutment piece jointed to the other end of the said chain, a lever, a block attached to the head of the said lever and adapted to receive the said abutment piece, a nut mounted on the said lever and engaging with the said screw bolt, and a spring fastened to the said lever and adapted to press the said chain on the pipe.

2. In a pipe wrench, the combination of a chain, a screw bolt jointed to one end of the said chain, an abutment piece jointed to the other end of the said chain, a lever, a block attached to the head of the said lever and adapted to receive the said abutment piece, a nut mounted on the said lever and engaging with the said screw bolt, a spring fastened to the said lever and adapted to press the said chain on the pipe, and a strip of protective material interposed between the said chain and the pipe.

3. In a pipe wrench, the combination of a chain, a screw bolt jointed to one end of the said chain, an abutment piece, a hollow lever inside which the said screw bolt is lodged, a block attached to the head of the said lever and adapted to receive the said abutment piece, a nut mounted on the said lever and engaging with the said screw bolt, and a spring fastened to the said lever and adapted to press the said chain on the pipe.

In testimony whereof, I affix my signature in presence of two witnesses.

ARCHIBALD LYLE WALLACE.

Witnesses:
   ARCHD. SHARP,
   WILLIAM REID SHARP.

Copies of this patent may be obtained for five cents each, by addressing the "Commissioner of Patents, Washington, D. C."